May 12, 1959 R. WUCHER 2,885,734
APPARATUS FOR MOULDING PLASTIC MATERIALS
Filed June 22, 1956 2 Sheets-Sheet 1

Inventor
R. Wucher

May 12, 1959 R. WUCHER 2,885,734
APPARATUS FOR MOULDING PLASTIC MATERIALS
Filed June 22, 1956 2 Sheets-Sheet 2

Inventor
R. Wucher
By Glascock Downing Seebold
Attys.

United States Patent Office 2,885,734
Patented May 12, 1959

2,885,734
APPARATUS FOR MOULDING PLASTIC MATERIALS

Roland Wucher, St. Ouen, France

Application June 22, 1956, Serial No. 593,282

Claims priority, application France June 24, 1955

8 Claims. (Cl. 18—30)

This invention relates to apparatus for moulding synthetic resins of all descriptions and natural and synthetic rubbers or other non-metallic mouldable materials or compositions. It is one of the objects of the invention to provide improved apparatus for injection moulding which is of relatively simple construction and is particularly adapted for rapid operation, as in the series production of moulded articles. A further object is to provide apparatus of the above character which affords greater uniformity or homogenity of the product.

Apparatus according to the invention comprises a heated cylinder, a screw or worm for feeding and plasticizing material supplied thereto, injection valve means at the forward end of the cylinder to which material can be fed, a diffuser head on the screw or worm, preferably at the forward end thereof, having narrow passages or channels therein through which the material is forced by the the screw or worm, and means for effecting relative motion between the screw or worm and the cylinder to effect injection moulding of the material by piston action of the diffuser head.

The valve means referred to above preferably comprises a nozzle adapted for engagement with a mould injection orifice and is adapted to be opened by relative movement between the mould and the injection cylinder or head.

According to a further feature of the invention the diffuser head is provided with non-return valve means.

The feeding and plasticizing screw or worm is preferably of relatively coarse pitch and is rotated at a relatively high speed, e.g. between 295 and 138 revolutions per minute, this speed being preferably variable.

According to a further feature of the invention the drive of the feeding screw is controllable by clutch means which is also adapted to act as a torque limitation device, and there is also preferably included means for reversing the drive when required, as for facilitating cleaning of the cylinder.

Other features of the invention will be clear from the following description and claims.

In the accompanying drawings.

Figure 1:
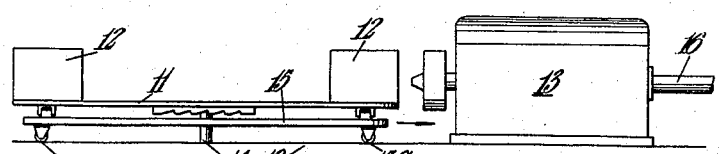
Figure 1 is a side elevation, more or less diagrammatic, of an apparatus or machine for moulding plastic materials arranged and constructed in accordance with the invention.
Figure 2:
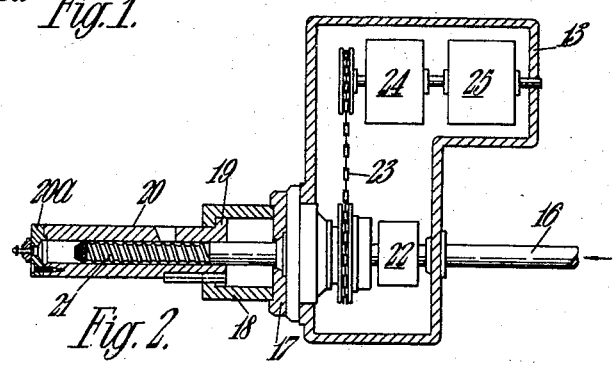
Figure 2 is a side elevation in section of the injection head of the apparatus of Figure 1.
Figure 3:
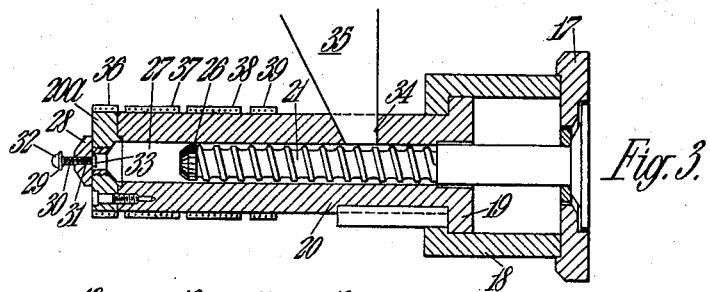
Figure 3 is a side elevation in section of a part of the injection head of Figure 2 to an enlarged scale.

In carrying the invention into effect according to one convenient mode as illustrated in Figures 1, 2 and 3, there is provided an injection moulding machine comprising a frame 10 on which is mounted a table 11 carrying a series of moulds 12. The table is rotatable about a shaft 14 and is carried by a support 15 slidable as e.g. on rollers 15a on the frame 10 and displaceable thereon by means of suitable mechanism (not shown). An injection head 13 is also displaceably mounted on the frame 10 and is adapted to be actuated by hydraulically or mechanically operated piston or pusher means 16. In order to carry out a moulding operation, the table support 15 is displaced so as to bring a mould 12 into engagement with the injection head 13, after which the plastic material is injected into the mould by displacing the piston or pusher means 16. When the moulding operation is complete the piston means 16 is returned rearwardly and the table support 15 is returned to its initial position to permit a fresh mould 12 to be aligned with the injection head 13 by rotating the table 11, the above operations being then repeated.

Referring to Figures 2 and 3, the injection head 13 comprises a support 17 displaceably mounted on the frame 10 and subject to the action of the piston or pusher means 16. The support 17 also comprises a casing 18 within which is mounted a flanged end 19 of a cylinder 20 adapted to slide within the casing 18. A screw or worm 21 is mounted for rotation within the cylinder but is fixed in regard to longitudinal movement to the support 17. The screw 21 is rotationally driven through clutch means 22, a chain or other transmission 23, and a variable speed gear 24 from a motor 25. A diffuser head 26 affording a series of narrow channels or passages is secured to the outer end of the screw 21 and fits closely within the cylinder 20. A chamber 27 is afforded between the diffuser head 26 and the outer end of the cylinder 20. An end plate 20a of the cylinder has a central aperture closed by a plug 28 which carries a valve 29. The latter comprises a sleeve 30, the interior of which communicates with lateral ports 31. The sleeve 30 also carries a nozzle 32 having a central bore and shaped for affording a connection with the inlet orifice of the mould. The opposite end of the sleeve 30 carries a closure disc 33. The length of the valve constituted by the sleeve 30 exceeds the longitudinal thickness of the plug 28 and the valve is adapted to slide in the plug so that in its outer position the outlet from the chamber 27 is closed and in its inner position it is possible for plastic material to flow out through the ports 31 and the sleeve bore when the nozzle 32 engages the plug 28. An opening 34 in the side of the cylinder 20 permits feeding thereto of raw material from a hopper 35. The cylinder is provided with cylindrical heaters indicated at 36, 37, 38 and 39, preferably of the electrical resistance type.

In carrying out a moulding operation the motor 25 is started up and the clutch 22 is engaged to drive the screw 21. The latter may be rotated, for example, at a speed of 100 to 300 revolutions per minute and has a length which preferably corresponds to about eight times its diameter. The raw material, which may be in powdered, granulated, cubed, puttied or other suitable condition, is introduced into the hopper 35 and enters the space between the cylinder 20 and the screw 21. The material is carried along by the screw and is thereby stirred and plasticized between the screw and the cylinder wall as it travels towards the diffuser head 26. Over the latter part of its path of travel the material is heated by the action of the heaters. The material is forced through the narrow passages of the diffuser head 26 and enters the chamber 27. The action of the diffuser head increases the uniformity and homogeneity of the material. As the chamber fills the pressure of material therein displaces the cylinder 20 to its extreme left hand position as seen in Figure 3, the flange 19 then bearing against the left hand wall of the casing 18. In this position the valve nozzle 32 is engaged with the orifice of the mould 12 and is displaced towards the right as seen in the figures so that the valve opening is placed in communication with the chamber 27 through the ports 31. At this time the screw 21 is disconnected from the drive by suitable mechanism disengaging the clutch 22 and the piston or pusher means 16 is displaced towards the left, thereby displacing the injection head 13 towards the left. Since the cylinder 20 remains stationary after its engagement with the mould the screw 21 and the casing 18 are thus displaced to the left causing the plasticized material in the chamber 27 to be compressed and forced into the mould, the valve being displaced into the cylinder whilst the diffuser head approaches the end of the latter. The diffuser head thus acts as a piston to inject the plasticized material into the mould. When the required amount of material has been injected into the mould a reverse movement is initiated by suitable automatic mechanism causing the piston or pusher means 16 to return towards the right and entrain the casing 18 and the screw 21, the cylinder 20 remaining stationary, until the flange 19 engages with the front wall of the casing 18. Further movement of the piston means 16 then effects the withdrawal of the cylinder 20. During these movements the diffuser head 26 is withdrawn into the cylinder 20 leaving the chamber 27 free for the reception of a fresh quantity of fluid or plasticized material, the valve 29 being then closed. The cycle of operations for a further mould injection is then recommenced.

Figure 4:
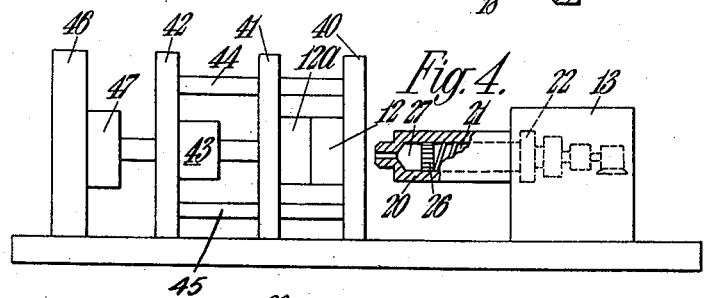
Figure 4 is a side elevation, partly in section, of another form of moulding apparatus in accordance with the invention.
Figure 5:
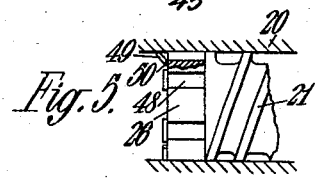
Figure 5 is a side elevation, partly in section, of a diffuser head.
Figure 6:
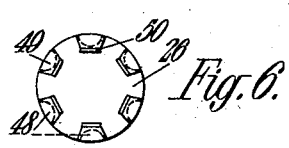
Figure 6 is a front view of the diffuser head.

In another mode of carrying the invention into effect as illustrated in Figures 4, 5 and 6, an injection head 13 is provided which may be similar to that previously described except that it is fixed in relation to the frame 10. A mould shown at 12, 12a is displaceably mounted on the frame 10. The mould comprising two parts 12 and 12a is mounted on two plates or supports 40 and 41. A plate 22 carries a jack or ram 43 for closing the mould. The assembly of plates is mounted on slide bars 44 and 45 and is displaceable on the frame 10. A bearer plate 46 is fixed to the frame 10 and carries an injection jack or ram 47. The mould parts 12 and 12a are located on the plates or supports 40 and 41 and can be closed together by operation of the jack or ram 43, whereby the plates or supports 40, 41 become in effect an integral unit. This assembly or unit is displaced upon the frame 10 by operation of the jack or ram 47, whereby the assembly and the mould are moved to engage the injection head 13.

The injection head 13 is generally of similar construction to the injection head previously described and has a screw or worm 21 which is fixed longitudinally and a cylinder 20 capable of longitudinal displacement relatively to the screw. If desired, however, the arrangement may be modified so that the cylinder is fixed and the screw is given a longitudinal translational movement simultaneously with its rotation.

The driving means for the screw 21 includes a clutch 22 which is also adapted to act as a safety device for torque limitation, and may also include reversing means of any desired type, operated by mechanical, electrical, or other means.

A diffuser head 26 is mounted on the forward end of the screw 21 and may be as described in the previous example. Alternatively, however, the diffuser head may be provided with non-return valve means as illustrated in Figures 5 and 6. The diffuser head comprises a cylindrical block 26 fitting closely in the cylinder 20 and having narrow channels or passages 48 formed in its periphery. A valve or blade 49 is located in front of each passage and is pivotally mounted at 50 so as to act in the manner of a flap valve. When the plastic material is compressed for injection into the mould the valve members open about their pivots to allow the material to be forced through the passages 48. If there is an excessive pressure in the compression chamber 27 the valves will close over the channels or passages and prevent reverse flow of the material. Other forms of non-return valve means may be provided as later described.

Figure 7:
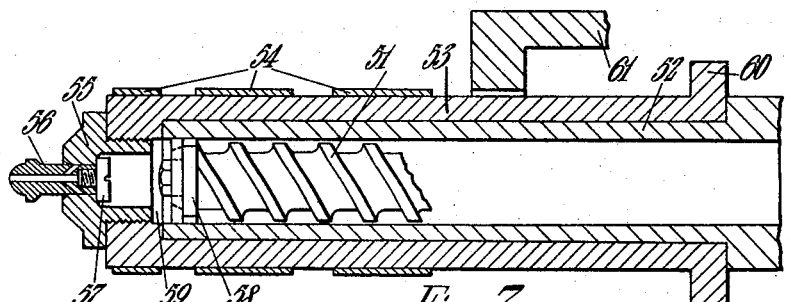
Figure 7 is a longitudinal section of a modified form of injection head.

In carrying the invention into effect according to another mode, the injection head cylinder described in the previous examples is modified as illustrated in Figure 7. A feeding and plasticizing screw 51 is rotatable by suitable drive means within an intermediate charging cylinder 52. An outer cylinder or jacket 53 provided with heating means 54 is slidable longitudinally over the intermediate cylinder 52. The forward end of the cylinder 53 is closed by an end cover 55 in which is slidable a valve nozzle member 56 adapted to be engaged with a mould orifice as previously described. The valve is provided with a closure disc 57. Also the forward end of the feeding screw 51 is provided with a diffuser head 58, preferably including non-return valve means. This modified injection head may be used with the arrangement of Figures 1 and 2 or with that of Figure 4. When used with the arrangement of Figures 1 and 2, material is introduced into the space between the screw 51 and the cylinder 52 by any suitable means (not shown) and is fed forwardly by the screw to produce a pressure in the space 59 causing the displaceable cylinder 53 to move to the left as seen in the figure until the flange 60 is stopped by the surrounding casing 61. Injection of material into the mould is effected by movement to the left of the injection head of Figures 1 and 2 as previously described, including the cylinder 52. After injection, the whole of the injection head 13 is returned rearwardly by means of suitable actuating mechanism. When used with the arrangement of Figure 4, the cylinder 52 remains stationary and the heating jacket 53 is slidable to the left, as seen in the figure, as previously described, this movement being effected by the feeding of material into the variable volume space 59. Injection is effected by movement of the mould against the injection valve of the cylinder 53 which opens the valve and displaces the said cylinder rearwardly relatively to the cylinder 52 and the screw 51.

Figure 8:
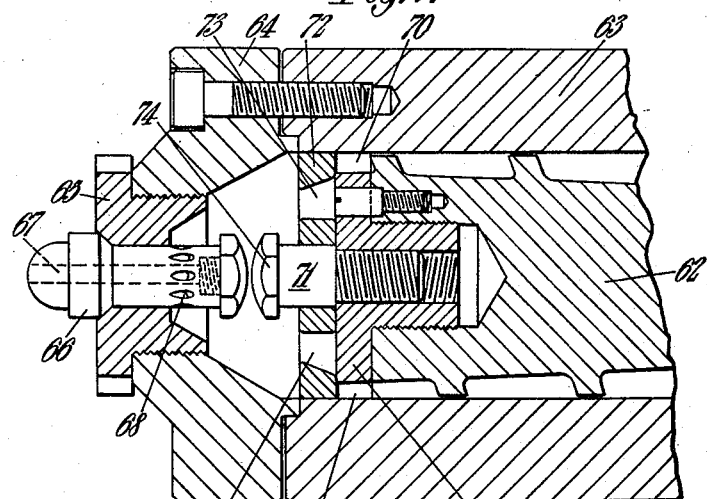
Figure 8 is a longitudinal sectional view of an injection head showing a modified form of non-return valve for the diffuser head.
Figures 9, 10:
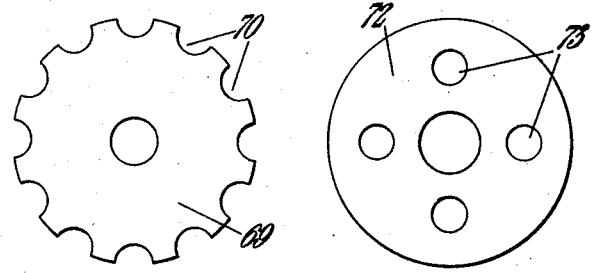
Figure 9 is an end view of the valve member of Figure 8.
Figure 10 is an end view of the diffuser head of Figure 8.

Figures 8, 9 and 10 illustrate a modified form of diffuser head and non-return valve arrangement which may be employed with any of the examples previously described. The feeding screw 62 is rotatable in a cylinder 63 and any suitable means may be provided for effecting relative movement between the screw and cylinder for injection purposes. The outer end of the cylinder has a cover plate 64 in which is secured a plug 65 carrying a slidably mounted valve 66 having a central bore 67 and lateral ports 68. In the position shown the valve is open for injection of material. When the valve occupies its extreme left hand position the ports 68 are covered by the bore of the plug 65 and the valve is closed. Secured to the forward end of the screw 62 is a diffuser head consisting of a circular disc 69 closely fitting within the cylinder bore and having narrow channels 70 formed in the periphery thereof. A stud 71 secured to the diffuser head carries a non-return value disc 72 slidable longitudinally thereon. The valve disc 72 is formed with passages 73 so positioned that when the disc abuts against the diffuser head as seen in Figure 8 the channels 70 are closed. A head 74 on the stud 71 limits longitudinal motion of the valve disc 72 thereon but permits the latter to move sufficiently to open the passages when the pressure of material to the right of the disc is sufficient. It will be noted that in this example the depth of thread of the screw 62 is shallower at the forward end thereof and decreases progressively. This assists in the feeding and plasticizing of the material.

It will be understood that the injection head arrangements of any of the preceding examples may be used in conjunction with a rotary mould table having operating mechanism as claimed in my co-pending patent application relating to apparatus for moulding plastic materials.

Apparatus according to the invention is adapted for the moulding of suitable injection mouldable rubber, rubber-like, or organic plastic materials, especially a polyvinyl plastic such as plasticized polyvinyl chloride or the like.

By this invention there is provided an improved injection moulding apparatus or machine which is particularly rapid and economical in operation. Also apparatus according to the invention is adapted to operate at low injection pressures, e.g. 1500 lbs. per square inch, and with temperatures of the material of between 100° C. and 300° C., according to the type of material employed.

I claim:

1. Apparatus for injection moulding comprising a heated cylinder, a feed screw mounted for rotation within the cylinder for feeding material supplied thereto to the forward end of the cylinder and simultaneously plasticizing said material, injection valve means at the forward end of the cylinder to which the material can be fed, a diffuser head carried on the forward end of the feed screw, said diffuser head having a multiplicity of narrow channels therein through which material is forced by the feed screw to increase uniformity and homogeneity of the material and prevent chemical decomposition thereof, non-return valve means controlling said narrow channels in the diffuser head, and means for effecting relative longitudinal motion between the cylinder and the feed screw for effecting injection moulding through the said injection valve means of material which has been fed by the feed screw to the forward end of the cylinder, whereby said injection is effected by piston action of the diffuser head in conjunction with the closed non-return valve means.

2. Apparatus according to claim 1, in which the diffuser head comprises a disc secured to the forward end of the feed screw and having narrow channels in its periphery and the non-return valve means comprises a valve disc mounted on the feed screw for limited longitudinal movement towards and away from the said diffuser disc, said valve disc having apertures therein located out of line with the diffuser head channels whereby when the valve disc abuts the diffuser head disc said channels are closed.

3. Apparatus according to claim 1, in which the cylinder is movable longitudinally relative to the feed screw under the pressure of material fed forwardly by the said screw, whereby the forward end of the cylinder becomes filled with material prior to injection, and said injection is effected by displacing the cylinder relatively to the feed screw, the latter remaining fixed longitudinally during injection.

4. Apparatus according to claim 1, in which the heated cylinder is displaceable longitudinally relative to the longitudinally stationary feed screw, and means is provided for displacing the said cylinder and a mould as a unit for injection purposes.

5. Apparatus according to claim 1, in which the heated cylinder comprises an outer cylinder and an intermediate cylinder within said outer cylinder, said intermediate cylinder being fixed longitudinally and the feed screw being mounted for rotation therein, the said outer cylinder being displaceable longitudinally relative to the intermediate cylinder and feed screw for injection purposes.

6. Apparatus according to claim 1, comprising driving means for the feed screw and clutch means for interrupting the feed screw drive when required.

7. Apparatus according to claim 1, comprising driving means for the head screw, and means in the drive for limiting the driving torque.

8. Apparatus according to claim 1, comprising driving means for the feed screw and means for reversing the drive to the feed screw.

References Cited in the file of this patent

UNITED STATES PATENTS

| | | |
|---|---|---|
| 2,333,056 | Thoreson et al. | Oct. 26, 1943 |
| 2,668,325 | Goodwin | Feb. 9, 1954 |
| 2,680,883 | Ashbaugh | June 15, 1954 |
| 2,734,226 | Willert | Feb. 14, 1956 |
| 2,754,545 | Hendry | July 17, 1956 |

FOREIGN PATENTS

| | | |
|---|---|---|
| 569,155 | Great Britain | May 10, 1945 |